(12) United States Patent
Rönneke et al.

(10) Patent No.: US 9,756,009 B2
(45) Date of Patent: Sep. 5, 2017

(54) MESSAGE FORWARDING AMONG DISPARATE COMMUNICATION NETWORKS

(75) Inventors: Hans Bertil Rönneke, Kungsbacka (SE); Magnus Olsson, Stockholm (SE); Peter Hedman, Helsingborg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 417 days.

(21) Appl. No.: 13/545,678

(22) Filed: Jul. 10, 2012

(65) Prior Publication Data
US 2013/0115983 A1 May 9, 2013

Related U.S. Application Data

(60) Provisional application No. 61/556,357, filed on Nov. 7, 2011.

(51) Int. Cl.
*H04W 4/12* (2009.01)
*H04L 12/58* (2006.01)
*H04W 4/00* (2009.01)

(52) U.S. Cl.
CPC ............ *H04L 51/38* (2013.01); *H04W 4/005* (2013.01); *H04L 51/14* (2013.01)

(58) Field of Classification Search
CPC ....... H04M 7/126; H04W 4/14; H04W 92/02; H04W 4/12; H04W 88/184; H04W 8/06
(Continued)

(56) References Cited

U.S. PATENT DOCUMENTS 7,558,578 B1 * 7/2009 De Beer ............... 455/445
2005/0163089 A1 7/2005 Purkayastha et al.
(Continued)

FOREIGN PATENT DOCUMENTS

CN 101175314 A1 5/2008
CN 101242559 A1 8/2008
(Continued)

OTHER PUBLICATIONS

3GPP TR 23.888 V1.5.0 (Oct. 2011), "3rd Generation Partnership Project; Technical Specification Group Services and System Aspects; System Improvements for Machine-Type Communications; (Release 11)" consisting of 155 pages.
(Continued)

*Primary Examiner* — Temica M Beamer
*Assistant Examiner* — Dung Lam
(74) *Attorney, Agent, or Firm* — Christopher & Weisberg, P.A.

(57) ABSTRACT

A method and system for forwarding information to a device in a communication network are disclosed. According to one aspect, a method includes selecting a serving node to which to send a request. The selected serving node is one of plurality of serving nodes, each of the plurality of serving nodes supporting a different access technology. The request is to transmit one of a short messaging service, SMS, message and trigger information. The request includes a list of the plurality of nodes. The method further includes sending the request to the selected serving node via a translation interface associated with the selected serving node. The translation interface is adapted to use a protocol that corresponds to the access technology of the selected serving node. If the selected serving node cannot reach the device, the request is forwarded to another serving node in the list of serving nodes in the request.

11 Claims, 5 Drawing Sheets

(58) Field of Classification Search
USPC .............................. 455/554, 466, 433, 432.2
See application file for complete search history.

(56) References Cited

U.S. PATENT DOCUMENTS

| | | | |
|---|---|---|---|
| 2006/0056342 A1 | 3/2006 | Lee | |
| 2008/0268843 A1* | 10/2008 | Ore | H04W 36/0061 455/435.3 |
| 2010/0080124 A1* | 4/2010 | Angiolini et al. | 370/235 |
| 2010/0317347 A1* | 12/2010 | Burbidge | H04W 36/0094 455/436 |

FOREIGN PATENT DOCUMENTS

| | | |
|---|---|---|
| CN | 102118700 A1 | 7/2011 |
| JP | 10-512121 A1 | 11/1998 |
| JP | 2003-189358 A1 | 7/2003 |
| JP | 2009-111485 A1 | 5/2009 |

OTHER PUBLICATIONS

PCT Invitation to Pay Additional Fees, Form PCT/ISA/206, for corresponding International Application No. PCT/IB2012/055858; International Filing Date: Oct. 24, 2012 consisting of 7-pages.

International Search Report and Written Opinion dated Apr. 22, 2013 for corresponding International Application No. PCT/IB2012/055858; International Filing Date: Oct. 24, 2012 consisting of 18-pages.

Mexican Office Action dated Mar. 20, 2015 and its English translation for corresponding Mexican Application No. MX/a/2014/005023 consisting of 6-pages.

Japanese Office Action mailing date Jun. 7, 2016 and its English translation for corresponding Japanese Application No. 2014-540580 consisting of 5-pages.

2nd-Chinese Office Action and Search Report dated Jan. 19, 2017 and its English translation for corresponding Chinese Application No. 201280054411.8 consisting of 21-pages.

Russian Office Action dated Sep. 16, 2016 and its English translation for corresponding Russian Application No. 2014123292/08(037946) consisting of 7-pages.

2nd Japanese Office Action dated Feb. 20, 2017 and its English translation for corresponding Japanese National Stage Application No. 2014-540580 consisting of 24-pages.

1st-Chinese Office Action and Search Report dated May 4, 2016 and its English translation for corresponding Chinese Application No. 201280054411.8 consisting of 8-pages.

* cited by examiner

MESSAGE FORWARDING AMONG DISPARATE COMMUNICATION NETWORKS

CROSS-REFERENCE TO RELATED APPLICATION

This application is related to and claims priority to U.S. Provisional Application Ser. No. 61/556,357, filed Nov. 7, 2011, entitled S3 FORWARDING, the entirety of which is incorporated herein by reference.

TECHNICAL FIELD

The present invention relates to communication networks, and in particular to forwarding information originating in one communication network to a device in a disparate communication network.

BACKGROUND

Wireless communication systems are continually evolving and improving. However, there is a need for backward compatibility between new wireless communication systems that conform to a new standard and legacy wireless communication systems that conform to older standards. For example, Long Term Evolution, LTE, systems should be backward compatible with older systems such as Global System for Mobile Communication, GSM. In particular, it is desirable to provide short messaging services, SMS, via an LTE system, even though SMS is a technology based on circuit-switching, and LTE is a technology that is designed to support packet-switched services.

In current installations there is no support for direct communication between an SMS service layer, which receives, stores, and forwards SMS messages and a mobile management entity, MME, of an LTE network. Also, there is no support for direct delivery of trigger messages from a machine type communication interworking function, MTC-IWF, to an MME. Currently, if an SMS message or trigger message is to be sent to a user equipment, UE, it is first sent to a Mobile Switching Center, MSC. If the UE is not camped on the network served by the MSC, the MSC must send a failure message back to the SMS service layer or the MTC-IWF. The SMS service layer or MTC-IWF must then direct the SMS message or trigger message to a serving general packet radio service, GPRS, support node, SGSN. If the UE is not camped on the network served by the SGSN, then the SGSN sends a failure message back to the SMS service layer or MTC-IWF. In response to this second failure, the SMS service layer or the MTC-IWF will again send a message to the MSC, this time instructing it to forward the request to an MME serving an LTE network. This repetition of the process of seeking the UE may be time consuming, and also costly if the sending node (e.g. a gateway mobile switching center, GWMSC, or SMS router) and the MSC, SGSN, and MME are owned by different service operators.

SUMMARY

The present invention advantageously provides a method and system for forwarding information to a device in a communication network. According to one aspect, a method includes selecting a serving node to which to send a request. The selected serving node is one of plurality of serving nodes, each of the plurality of serving nodes supporting a different access technology. The request is to transmit one of a short messaging service, SMS, message and trigger information. The request includes a list of the plurality of nodes. The method further includes forwarding the request to the selected serving node via a translation interface associated with the selected serving node. The translation interface is adapted to use a protocol that corresponds to the access technology of the selected serving node. If the selected serving node cannot reach the device, that serving node forwards the request to another serving node in the list of serving nodes that is included in the request.

According to another aspect, the invention provides a translation interface system in communication with a first serving node supporting a first access technology and a second serving node supporting a second access technology different from the first access technology. The translation interface system includes a first translation interface and a second translation interface. The first translation interface is adapted to communicate with the first serving node via a first protocol. The second translation interface is adapted to communicate with the second serving node via a second protocol different from the first protocol.

According to another aspect, the invention provides a method for communicating a message from a first communications infrastructure entity to an end device in communication with one of a mobile management entity, MME, and a serving general packet radio service, GPRS, support node, SGSN. The method includes sending a message to one of the SGSN and the MME. The one of the MME and SGSN determines if the end device is in communication with the one of the MME and SGSN. If the end device is not in communication with the one of the MME and SGSN, then the message is forwarded to the other of the SGSN and the MME via an S3 interface between the SGSN and the MME.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Before describing in detail exemplary embodiments that are in accordance with the present invention, it is noted that the embodiments reside primarily in combinations of apparatus components and processing steps related to forwarding information in a communication network. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Figure 1:
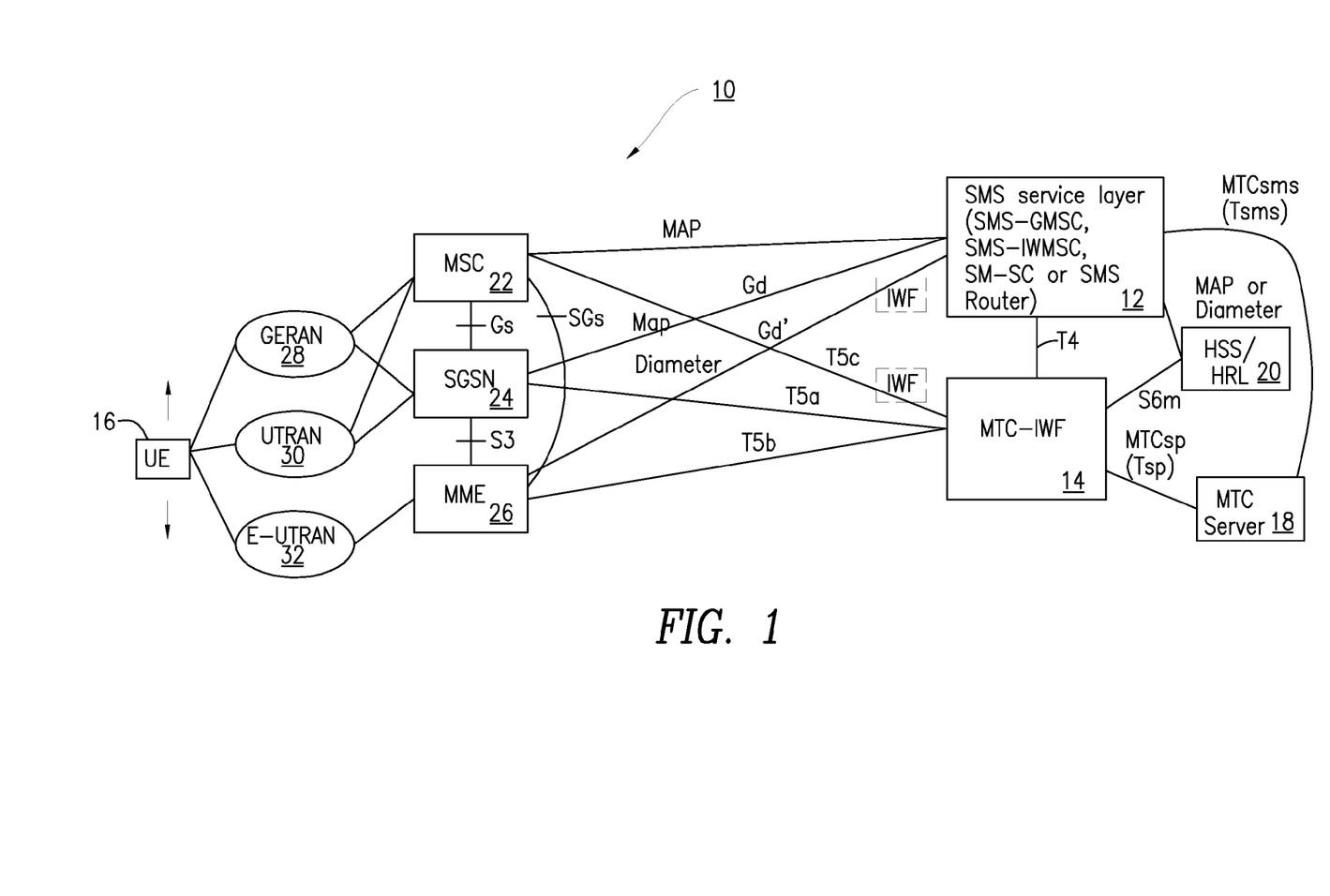
FIG. 1 is a block diagram of an exemplary communication system constructed in accordance with principles of the present invention.

Referring now to the drawing figures, in which like reference designators denote like elements, there is shown in FIG. 1 an exemplary block diagram of a communications network 10 constructed in accordance with principles of the present invention. The communications network 10 includes a short messaging service, SMS, service layer 12 and a machine type communication interworking function, MTC-IWF 14. A purpose of the SMS service layer 12 is to forward short messages destined to user equipment UE 16. SMS is a text messaging service component of mobile communication systems using standardized protocols that allow exchange of short text messages between fixed and mobile phones and devices. A purpose of the MTC-IWF 14 is to forward trigger messages to the UE 16. A trigger message may include an Internet Protocol, IP, address or domain name to which the UE 16 is to connect to start a communication flow, or may include other application specific parameters.

The SMS service layer 12 is equipment that may be owned by a communication system operator and is situated at a border of the operator's system. Similarly, the MTC-IWF 14 is also equipment that may be owned by a communication system operator and is situated at a border of the operator's system. The MTC-IWF 14 is in communication with an MTC server 18 (also known as a Service Capability Server, SCS) using a Tsp protocol (also referred to as MTCsp). The MTC server 18 includes infrastructure that a machine-to-machine, M2M, service provider uses to communicate with an operator network and other equipment to operate its M2M services, and may include servers, routers, DNS servers, Radius servers, AAA servers, security servers, and VPN servers. The MTC-IWF provides a single interface to hide and protect other operator nodes, and converts Tsp protocol to other protocols depending upon which node within an operator network needs to be contacted.

The SMS service layer 12 and the MTC-IWF 14 are in communication with a Home Subscriber Server/Home Location Register (HSS/HLR) 20. A purpose of the HSS/HLR is to keep track of the location of UE 16 and other roaming user equipment. The HSS/HLR includes a master database that supports network entities that handle calls. The database contains subscription-related information (also called subscriber profiles), performs authentication and authorization, and can provide information about a UE 16's location in terms of current serving node(s). The SMS service layer 12 is in communication with the HSS/HLR 20 using a Mobile Application Part, MAP, protocol or Diameter protocol. The MTC-IWF 14 is in communication with the HSS/HLR 20 using an S6m interface using a Diameter protocol. As is known in the art, the MAP protocol is based on the signaling system 7, SS7, protocol. The Diameter protocol is defined by the Internet engineering task force, IETF, RFC 3588 specification.

The SMS service layer 12 and the MTC-IWF 14 are in communication with serving nodes that may include a mobile switching center, MSC, 22, a serving general packet radio service, GPRS, support node, SGSN, 24 and a mobile management entity, MME, 26. The serving node MSC 22 utilizes a radio access technology known as GSM Edge Radio Access Network, GERAN, 28 to provide SMS and circuit switch services. The serving node SGSN 24 utilizes a radio access technology known as GSM Edge Radio Access Network, GERAN, 28 and Universal Terrestrial Radio Access Network, UTRAN, 30, for providing both SMS and packet switch services. The serving node MME 26 utilizes a radio access technology known as Evolved-UTRAN, 32, also known as Long Term Evolution, LTE.

The SMS service layer 12 is in communication with a serving node via an interface that utilizes a protocol associated with the radio access technology of the serving node. For example, the SMS service layer 12 communicates with the MSC serving node 22 and the SGSN serving node 24 using the MAP protocol. In particular, the SMS service layer communicates with the SGSN serving node 24 via a Gd interface. The SMS service layer 12 communicates with the MME serving node 26 using the Diameter protocol via a Gd' interface. The Gd' interface is also known as the SGd interface. The Gd' interface preferably has the same messages, parameters and functions as the Gd subset of the MAP protocol. By using the Diameter protocol via the Gd' interface, the SMS service layer 12 can transmit an SMS message intended for a UE in the E-UTRAN network 32 directly to the MME serving node 26 that serves the E-UTRAN network 32. Further, an SMS message originating at the UE 16 can be transmitted from the UE 16 to the SMS service layer 12 via the MME serving node 26 using the Diameter protocol of the Gd' interface. The term, SMS service layer, may include an SMS-IWMSC, an SMS-GWMSC, an SMS router or SMSC-SC as described in the $3^{rd}$ Generation Partnership Project, 3GPP, technical standard, TS, 23.040.

The MTC-IWF 14 is in communication with a serving node via an interface that utilizes a protocol associated with the radio access technology of the serving node. For example, the MTC-IWF 14 is in communication with the MSC serving node 22 using a T5c translation interface. The MTC-IWF 14 is in communication with the SGSN serving node 24 using a T5a translation interface. The MTC-IWF 14 is in communication with the MME serving node 26 using a T5b translation interface.

The serving nodes 22, 24 and 26 are also in communication with each other. For example, the MSC serving node 22 is in communication with the SGSN serving node 24 via a Gs interface. The MSC serving node 22 is in communication with the MME serving node 26 via an SGs interface. The SGSN serving node 24 is in communication with the MME via an S3 interface. In case the SGSN and MME are combined into a single unit, the S3 interface can be omitted.

Thus, one embodiment provides a translation interface system in communication with a first serving node 24 supporting a first radio access technology 30, and a second serving node 26, supporting a second radio access technology 32. The translation interface system includes a first translation interface adapted to communicate with the first serving node 24 via a first protocol, and a second translation interface adapted to communicate with the second serving node 26, via a second protocol different from the first protocol. The first serving node 24 and the second serving node 26 may communicate with each other by an interface, such as an S3 interface, that depends upon the type of serving nodes that are in communication.

When an SMS message is to be delivered to a particular UE 16, the SMS service layer 12 communicates with the HSS/HLR 20 to determine in which network—GERAN 28, UTRAN 30, or E-UTRAN 32—the UE 16 was last reported. Upon determining the last reported network, the SMS service layer 12 may send an SMS request to the serving node that serves that network. For example, if the UE 16 was last reported in the GERAN network 28, the SMS service layer 12 will send the SMS request to the MSC serving node 22. The SMS request includes an SMS message to be delivered to the UE 16 and also includes a list of the serving nodes where the UE 16 has been reported served in the different networks GERAN 28, UTRAN 30, or E-UTRAN 32. Thus, for example, the SMS request could include an identity of the MSC serving node 22, the SGSN serving node 24 and the MME serving node 26.

When an SMS request is received by a serving node, the serving node that receives the request determines whether the UE 16 to which the request is intended is in the network served by the serving node that receives the request. For example, if the SGSN serving node 24 receives the SMS request from the SMS service layer 12, the SGSN serving node 24 determines whether the UE 16 is served by a radio access technology of the SGSN serving node 24. If the UE 16 is served by the SGSN serving node 24, the SMS message included in the SMS request is sent to the UE 16 by the SGSN serving node 24.

If the UE 16 is not served by the SGSN serving node 24, then the SGSN serving node 24 forwards the SMS request to one of the other serving nodes listed in the request. Thus, for example, the SGSN serving node 24 forwards the request to one or both of the serving nodes 22 and 26. The serving nodes 22 and 26 determine whether the UE 16 is in the network that the serving node services. For example, the MSC serving node 22 will determine if the UE 16 is in a network that is served by the MSC serving node 22. Likewise, the MME serving node 26 will determine if the UE 16 is in the E-UTRAN network 32 that is served by the MME serving node 26.

Similarly, when a trigger message or small data is to be delivered to a particular UE 16, the MTC-IWF 14 looks to the HSS/HLR 20 to determine in which serving node—MSC 22, SGSN 24, or MME 26—the UE 16 was last reported. Small data is defined in accordance with 3GPP TS 22.368 and TS 23.682 as infrequent communication of data up to a size of 1 kilo-byte. Hereafter, the discussion of handling a trigger message shall also apply to handling of small data. Upon delivering a trigger request to a UE 16, the MTC-IWF 14 may send a trigger request to the last reported serving node. For example, if the UE 16 was last reported in the MSC 22, the MTC-IWF 14 will send the trigger request to the MSC serving node 22. The trigger request may include an IP address to which the UE 16 is to connect and other application specific parameters, and also includes a list of the serving nodes that serves the UE 16. Thus, for example, the trigger request could include an identity of the MSC serving node 22, the SGSN serving node 24 and the MME serving node 26.

When a trigger request is received by a serving node, the serving node that receives the request determines whether the UE 16 to which the request is intended is served by the serving node receiving the request. For example, if the SGSN 24 receives the trigger request from the MTC-IWF 14, the SGSN 24 determines whether the UE 16 is in the GERAN 28 or the UTRAN network 30 that the SGSN 24 serves. If the UE 16 is in a network served by the SGSN 24, the trigger message included in the trigger request is sent to the UE 16 via the network where the SGSN 24 can reach the UE 16. If the UE 16 is not reachable by SGSN serving node 24, the SGSN serving node 24 forwards the trigger request to one or both of the other serving nodes listed in the request. Thus, for example, the SGSN serving node 24 may forward the request to one or both of the serving nodes 22 and 26.

The serving nodes 22 and 26 determine whether the UE 16 is in the network that the serving node serves. For example, the MSC serving node 22 will determine if the UE 16 is in a network that is served by the MSC serving node 22. Likewise, the MME serving node 26 will determine if the UE 16 is in the E-UTRAN network 32 that is served by the MME serving node 26.

A serving node can ascertain if the UE 16 for which an SMS message or trigger information is intended is camped on the network served by the serving node in a number of ways. For example, the serving node may be kept informed regarding which radio access technology, RAT, the UE is camped on using Idle Mode Signaling Reduction, ISR. Also, the serving node may be informed regarding which RAT the UE is camped on by use of Dual Registration in LTE systems where the HSS/HLR 20 is kept informed of whether the UE has moved from an MME to an SGSN or vice versa. Note that the process of forwarding a request to another serving node, as described herein, preferably involves only one home public land mobile network—visited public land mobile network, HPLMN-VPLMN, interaction.

Figure 2:
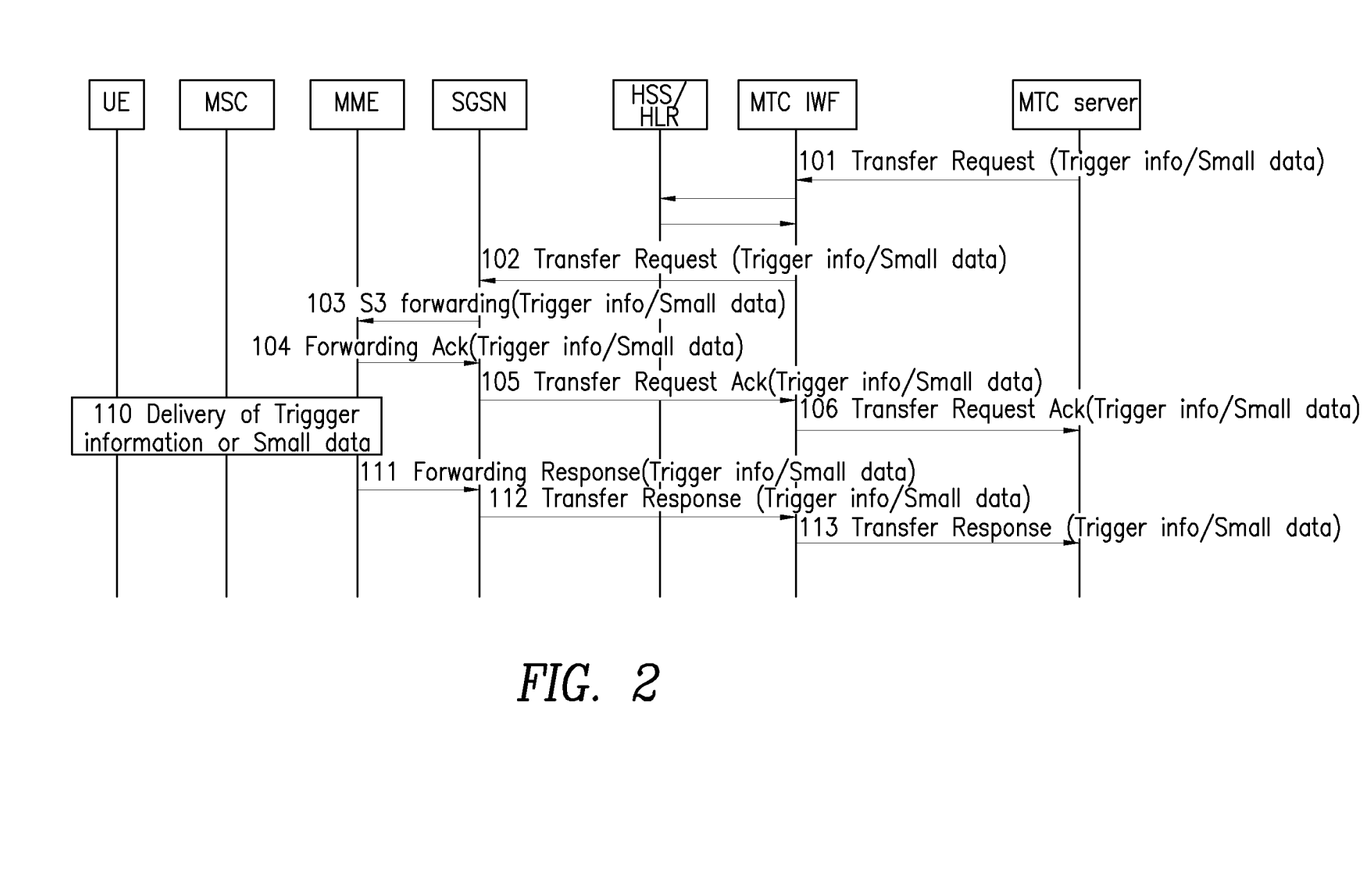
FIG. 2 is a message flow diagram of messages exchanged in implementing communication between a user equipment UE and a mobility management entity, MME.

FIG. 2 is an exemplary signal flow diagram for delivery of trigger information to a UE 16 that is in an E-UTRAN network at the time of delivery and processing of the trigger information. In step 101 of FIG. 2, the MTC server 18, sends a transfer (trigger) request to the MTC-IWF 14. The transfer request identifies the UE 16 by one or another of an external ID, MSISDN, IMSI, or other UE identifier. The transfer request may optionally include a validity timer if the network is to store the transfer request and try again at a later time to deliver the request to the UE if the UE is not reachable at the moment.

The MTC-IWF may ascertain which RAT the UE 16 was last camped on and which serving nodes 22, 24, 26 may currently serve the UE 16 via the HSS/HLR 20. The HSS/HLR 20 may optionally supply the time when the serving nodes performed their last location update to the HSS/HLR 20 database and may supply other UE subscription and status information, including serving node capabilities for optimized network access stratum, NAS, and small data. For example the HSS/HLR 20 information may indicate whether a function indicated by the trigger request is supported for the UE's current subscription. If not supported, the attempt to transfer the trigger request to the UE may be terminated. Note that information retrieved from the HSS/HLR 20 may be cached in the SMS service layer 12 and/or the MTC-IWF 14.

When the MTC-IWF 14 receives the information from the HSS/HLR 20, the MTC-IWF 14 makes a decision as to which serving node to send the transfer request. This decision may be based on whether the UE has packet-switched, PS, only subscription or both PS and circuit-switched, CS, subscription, and whether the serving node supports optimized NAS and small data. A serving node which did the latest location update to the HSS/HLR may be given higher priority. Also, the serving node used in the most recent successful attempt at delivering trigger information or small data information may be preferred.

In the example of FIG. 2, the MTC-IWF 14 sends the transfer request to the SGSN 24, (step 2). Note that if a validity timer is set in the transfer request, the MTC-IWF 14 may decide to immediately pass the transfer request as a short message to the SMS service layer 12 over the T4 interface, or may decide to first attempt to transfer the transfer request directly to the serving node over the T5a interface.

The transfer request may include a parameter that addresses any other serving nodes of the UE 16, such as serving nodes 22 and 24. The serving node that receives the transfer request checks to see if it can reach the UE. In this example, the UE is not camped on the UTRAN or GERAN served by the SGSN 24. Thus, at step 103, the SGSN 24 forwards the request to the MME 26 using the S3 interface. In response to receiving the request, the MME 26 determines if the UE 16 is camped on the E-UTRAN 30, and if so, forwards an acknowledgment signal to the SGSN 24 at step 104. Thus, by including a list of serving nodes, the first serving node to receive the transfer request, will know how to forward the transfer request to another serving node in the list. A serving node that has unsuccessfully tried to transfer an SMS or small data to a UE 16, may mark that it has already tried a delivery to a serving node in the list of serving nodes that is included in the forwarded transfer request. This will avoid a condition where the same serving node tries to deliver the data more than one time.

At step 105, a transfer request acknowledgment is sent by the SGSN 24 to the MTC-IWF 14. This transfer acknowledgment request may include a parameter indicating which serving node (and possibly also which RAT) the UE 16 is currently camped on, and the transfer acknowledgment request may also report whether the SGSN 24 was able to page the UE and whether it is attempting to deliver the transfer request to the UE. The MTC-IWF 14 may time stamp this information. If the attempt has failed or is otherwise not proceeding, the MTC-IWF may reattempt to transfer the request over a T5 interface or the T4 interface, depending on the number of serving nodes and a validity time determined by a validity timer maintained in the MTC-IWF.

At step 106, the MTC-IWF 14 sends a transfer request acknowledgment to the MTC server 18 indicating that delivery to the UE 16 is in progress. If the transfer request was received by the network and is in progress for delivery, the MTC server 18 stops any repetition of its transfer requests and waits for a response. If the transfer request failed, the MTC server may internally schedule a new trigger request in the near future, based on a cause code in the acknowledgement request received from the SGSN serving node 24 if the SGSN serving node 24 indicates the cause of the failure. The next trigger request to be sent may be sent to a different serving node.

At the same time as sending the forwarding acknowledgment signal to the SGSN 24 at step 104, the trigger information is sent by the MME 26 to the UE 16, at step 110, and the UE 16 sends a response signal back to the MME 26. The trigger information sent to the UE may be formatted as an SMS message and may include a signature to validate the authenticity of the device trigger. The response from the UE is forwarded to the SGSN 24 at step 111 via the MME 26. The SGSN 24 forwards the response to the MTC-IWF 14, at step 112, which in turn forwards the response to the MTC server 18, at step 113. If delivery to the UE 16 by the MME 26 fails, the SGSN serving node 24 may retry by forwarding the data to the MSC 22. Alternatively, the second retry to the MSC 22 can be performed by the MME 26. If the delivery to the UE 16 has been successful or if all serving nodes have failed to deliver to the UE 16, the MTC-IWF 14 will at step 112 receive a cause code indicating success or the cause of a failure. When all serving nodes have been attempted and depending upon the cause code, the MTC-IWF 14 may fall back on attempting delivery via the SMS service layer 12.

Similar steps are followed when forwarding a request from the MME 26 to the SGSN 24 using the S3 interface, forwarding a request from the MME 26 to the MSC 22 using the SGs interface, forwarding a request from the MSC 22 to the MME 26 using the SGs interface, forwarding a request from the SGSN 24 to the MSC 22 using the Gs interface, and forwarding the request from the MSC 22 to the SGSN 24 using the Gs interface. In the reverse direction, a message from a UE camped on the LTE network can be transmitted directly to the SMS service layer 12 via the MME using the Gd' interface (also known as the SGd interface).

Note that any necessary messages to support acknowledgements, such as the acknowledgements discussed above, or other protocol handshakes, toward the originating protocol on the respective T5, Gd, Gd', or MAP interfaces may also be included in new messages added to the S3, Gs, and SGs protocols. These new messages may be seen as an extension to the originating protocol on the respective T5, Gd, Gd', or MAP interfaces. The forwarding on S3, Gs and SGs may alternatively use a different protocol than was used on the receiving interface, e.g. a general packet radio tunneling protocol, GTPv2-C, on the S3 interface.

As noted, in some embodiments, the MTC-IWF trigger message may be sent to a serving node via the SMS service layer 12, and then forwarded to a serving node via the SMS service layer 12. Note also that the MTC-IWF 14 is a pure control plane function which delivers the trigger information toward the UE regardless of the packet data protocol/packet data network, PDP/PDN, connection state. The network confirms the success or failure of delivering the trigger to the UE back to the MTC server 18. The trigger information is delivered to an MTC application in the UE, which may start communicating with the MTC server 18 in response to the trigger information.

Thus, when the MTC-IWF 14 receives a device trigger request, the MTC-IWF 14 initiates a lookup in the HSS 20 to learn the most recent serving nodes on which the UE has been camped, unless this information is already known to the MTC-IWF 14 by caching. The MTC-IWF 14 then forwards the trigger request with the trigger information to one of the indicated serving nodes. Since the paging procedure by which the UE is notified of the request may take some time, the serving node may immediately acknowledge the trigger request. Alternatively, when there is more than one serving node, the MTC-IWF 14 may send the trigger request to each serving node, or wait for a response from a first serving node before deciding whether to send the trigger request to a second serving node. Waiting will ensure a minimized response time, at the cost of more signaling.

Figure 3:
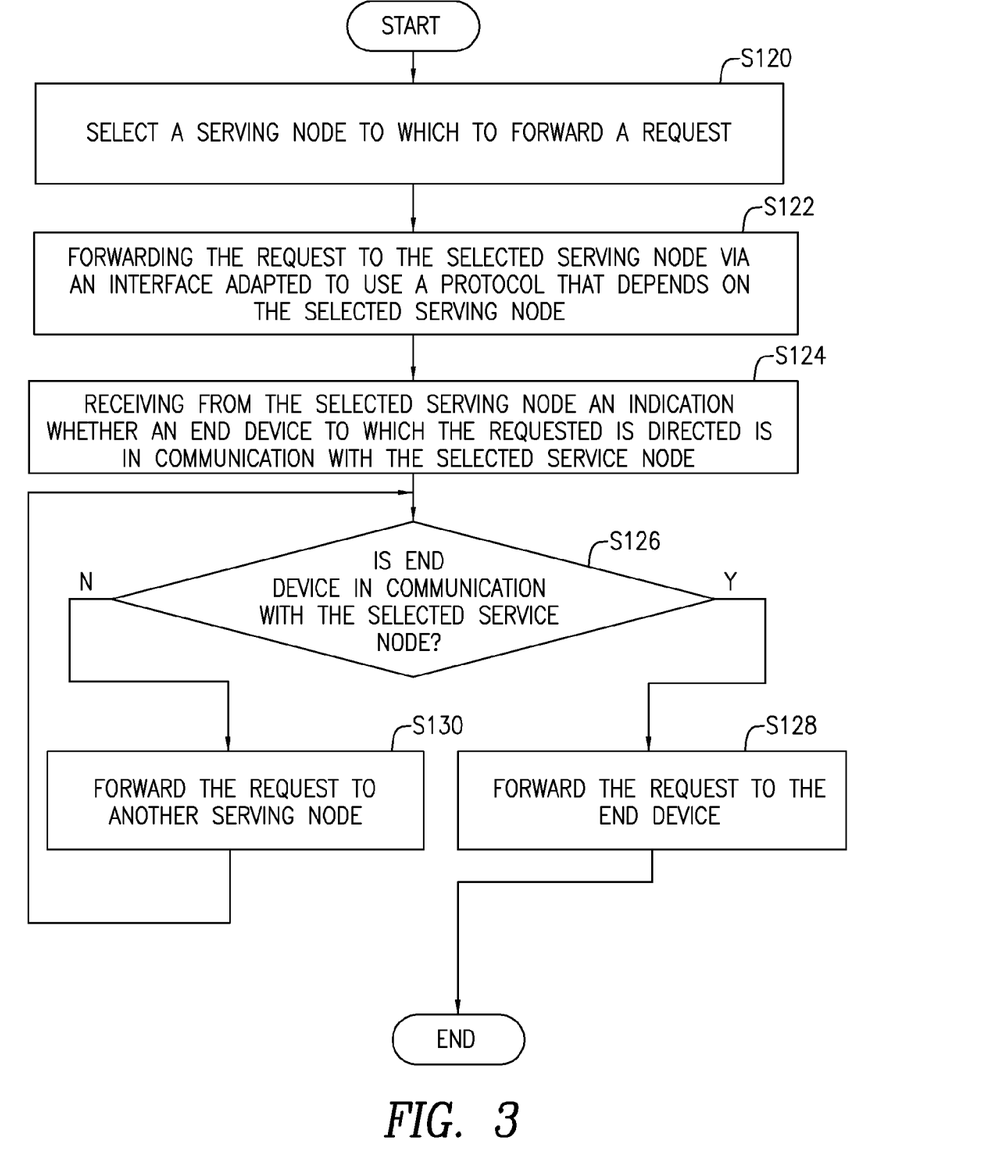
FIG. 3 is a flowchart of an exemplary process for forwarding information in a wireless communication network.

FIG. 3 is a flowchart of an exemplary process for forwarding information in a communication network. A serving node to which to forward an SMS request or trigger request is selected (step S120). The request also contains a list of other serving nodes that serve the UE to which the request is directed. The selection of a serving node may be based on most recently available information in a HSS/HLR concerning by which serving nodes a UE is being served. The request is then forwarded to one selected serving node via of an interface adapted to use a protocol that depends on the selected serving node (step S122). The selected serving node indicates whether the intended UE designated by the request is served by the selected serving node (step S124). If the intended UE is in communication with the selected serving node, as determined at step S126, then information contained in the request is forwarded to the intended UE (step S128). If the intended UE is not in communication with the selected serving node, then the request is forwarded to another serving node in the list (step S130).

Figure 4:
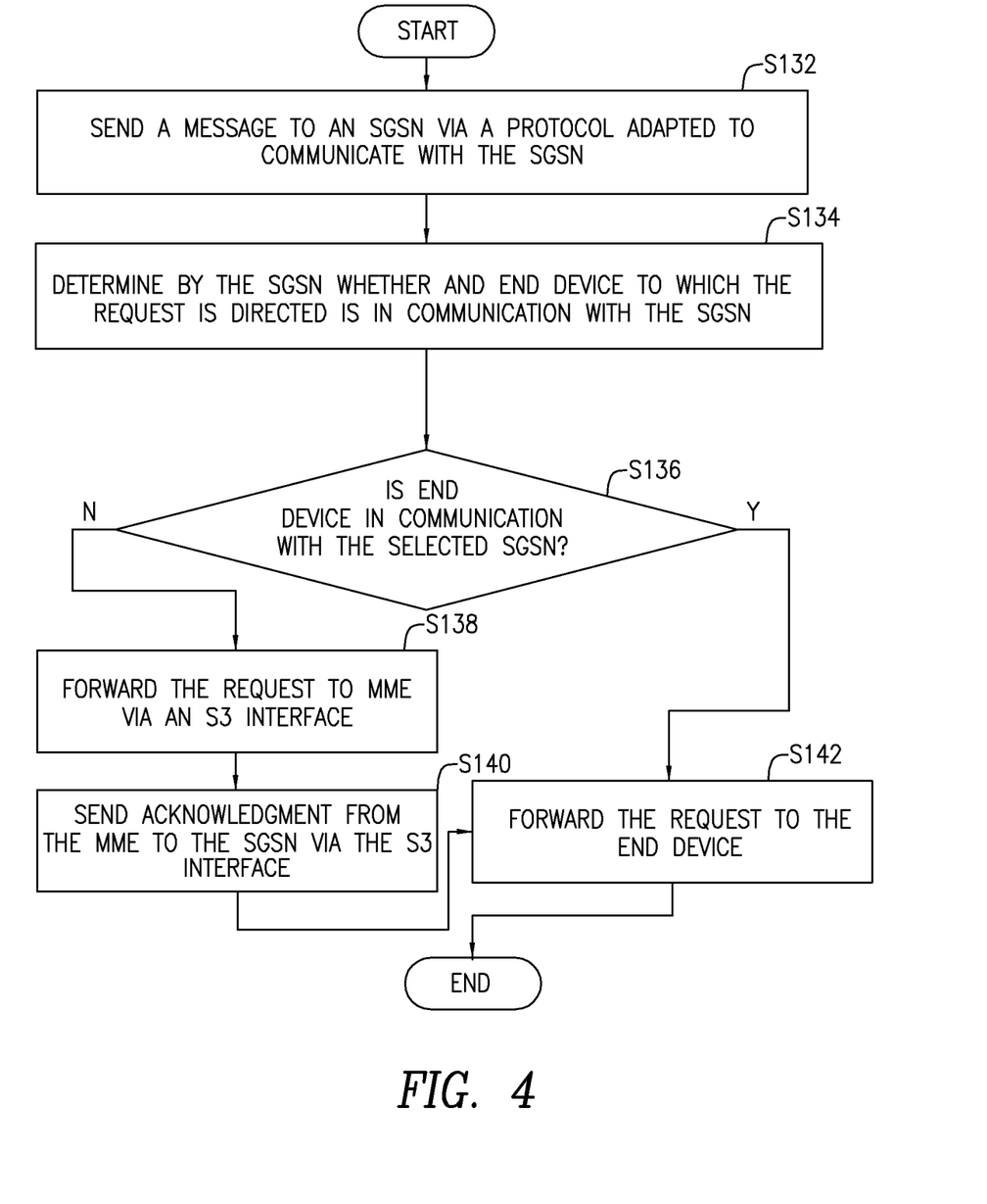
FIG. 4 is a flowchart of an exemplary process for forwarding information from a serving general packet radio service, GPRS, support node, SGSN, and an MME.

An exemplary process for forwarding information in a communication network having an SSGN 24 and an MME 26 is described with reference to FIG. 4. A message is sent to a selected SGSN 24 via a protocol adapted to communicate with the SGSN 24 (step S132). This may occur as a result of determining that a UE to which the message is intended was last reported to be served by the SGSN serving node 24. The SGSN serving node 24 may determine whether the intended UE is in communication with the SGSN (step S134). If the intended UE is in communication with the selected SGSN, as determined at step S136, the request is forwarded to the intended UE (step S142). If the intended UE is not in communication with the selected SGSN, the request is forwarded to the MME 26 via an S3 interface (step S138). An acknowledgment that the request is received by the MME 26 and forwarded to the UE 16 is sent from the MME 26 to the SGSN 24 (step S140).

Figure 5:
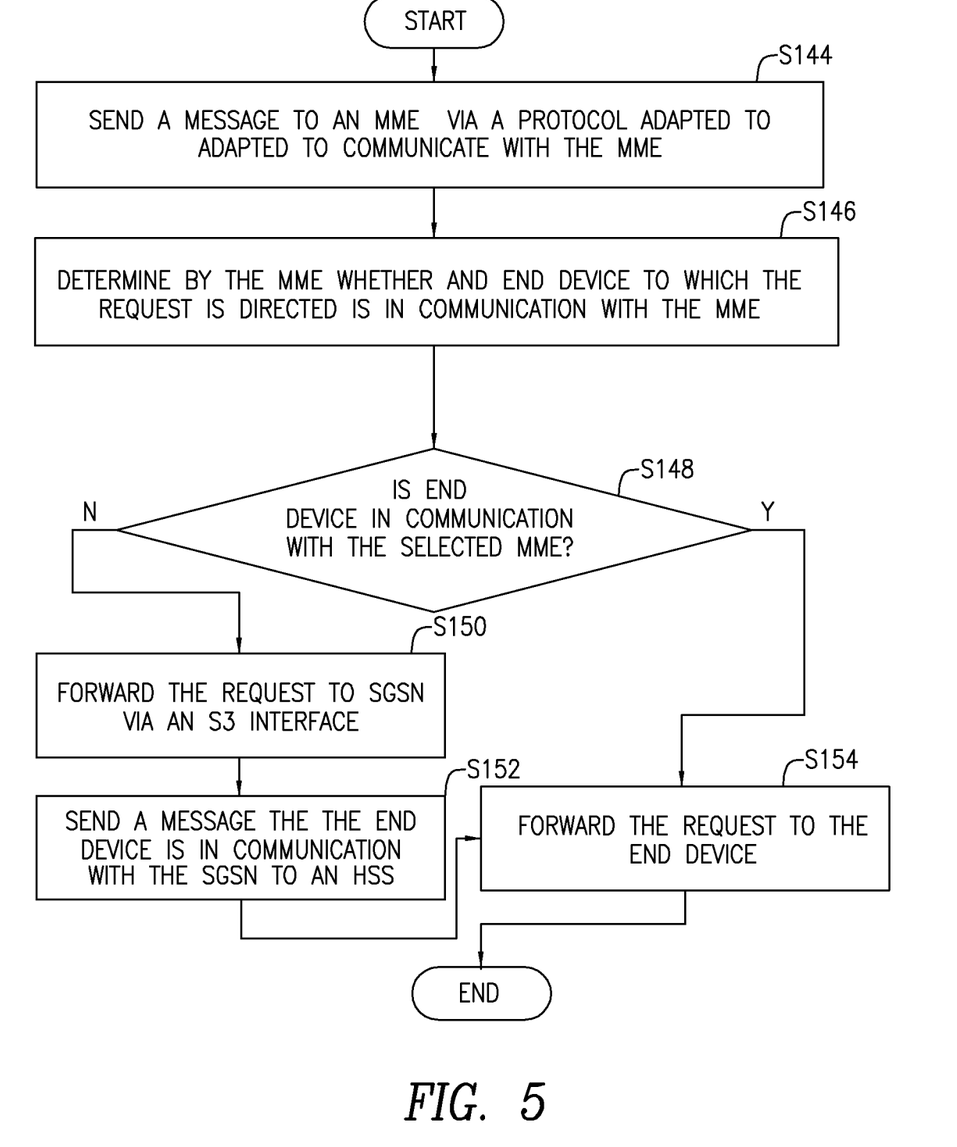
FIG. 5 is a flowchart of an exemplary process for forwarding information from and MME to an SGSN.

FIG. 5 is a flowchart of another exemplary process for forwarding information in a communication network having an SSGN 24 and an MME 26. A message is sent to a selected MME 26 via a protocol adapted to communicate with the MME 26 (step S144). This may occur as a result of determining that a UE to which the message is intended was last reported to be served by the MME 26. The MME 26 may determine whether the intended UE is in communication with the MME 26 (step S146). If the intended UE is in communication with the selected MME 26, as determined at step S136, the request is forwarded to the intended UE (step S154). If the intended UE is not in communication with the selected MME 26, the request is forwarded to the SSGN 24 via an S3 interface (step S150). An acknowledgment that the request is received by the SSGN 24 and forwarded to the UE 16 is sent from the SGSN 24 to the MME 26 (step S152).

The present invention can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile tangible storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method for forwarding information to a device in a communication network, the method comprising:
   selecting a serving node to which to forward a request, the selected serving node being one of a plurality of serving nodes, at least two of the plurality of serving nodes each supporting a different access technology, each different access technology being one of GSM Edge Radio Access Network, GERAN, Universal Terrestrial Radio Access Network, UTRAN, and Evolved-UTRAN, e-UTRAN, the request being a request to transmit one of a messaging service message and trigger information, the request including a list of the plurality of serving nodes; and
   sending the request to the selected serving node via a translation interface associated with the selected serving node, the translation interface adapted to use a protocol that corresponds to an access technology of the selected serving node; and
   the selected serving node forwarding the request to a second serving node in the list of the plurality of serving nodes in the request in case the selected serving node cannot reach the device, the second serving node being of a different access technology than the access technology of the selected serving node.

2. The method of claim 1 wherein the access technology of the selected serving node is one of GSM Edge Radio Access Network, GERAN, Universal Terrestrial Radio Access Network, UTRAN, and Evolved-UTRAN.

3. The method of claim 1, wherein the selected serving node is one of a mobile management entity, MME, a Serving General Packet Radio Service, GPRS, Support Node, SGSN, and a mobile switching center (MSC).

4. The method of claim 3, wherein the protocol that depends on the selected serving node is based on a Diameter protocol when the selected serving node is an MME.

5. The method of claim 3, wherein the protocol that depends on the selected serving node is based on Mobile Application Part, MAP, when the selected serving node is one of an SGSN and a MSC.

6. The method of claim 3, wherein the protocol that depends on the selected serving node is based on a Diameter protocol when the selected serving node is one of an SGSN and a MSC.

7. The method of claim 1, wherein the serving node is selected by a short messaging service center, SMSC, and wherein the messaging service message is a short messaging service, SMS, message.

8. The method of claim 1, wherein the serving node is selected by a short message service router, SMS Router, and wherein the messaging service message is a short messaging service, SMS, message.

9. The method of claim 1, wherein the serving node is selected by a machine type communication interworking function, MTC-IWF, and wherein the messaging service message is one of a trigger information and small data service message.

10. The method of claim 1, wherein the serving node is selected based on information received from one of a home subscriber server, HSS, and a home location register, HLR.

11. The method of claim 1, further comprising receiving an indication from the serving node as to whether an end device to which the request is directed is in communication with the selected serving node.

* * * * *